(12) United States Patent
Brewer et al.

(10) Patent No.: US 7,133,399 B1
(45) Date of Patent: Nov. 7, 2006

(54) SYSTEM AND METHOD FOR ROUTER CENTRAL ARBITRATION

(75) Inventors: Tony M. Brewer, Plano, TX (US);
Gregory S. Palmer, Plano, TX (US);
Keith W. Shaw, Plano, TX (US)

(73) Assignee: Chiaro Networks Ltd, Tel Aviv (IL)

( * ) Notice: Subject to any disclaimer, the term of this patent is extended or adjusted under 35 U.S.C. 154(b) by 913 days.

(21) Appl. No.: 09/703,056

(22) Filed: Oct. 31, 2000

(51) Int. Cl.
*H04Q 12/28* (2006.01)
(52) U.S. Cl. ........................... 370/360; 370/380
(58) Field of Classification Search ............... 370/447, 370/461, 462, 415, 416, 412, 230, 395.1, 370/351, 353, 449, 413, 414, 417, 418; 710/107; 398/51
See application file for complete search history.

(56) References Cited

U.S. PATENT DOCUMENTS

| | | | |
|---|---|---|---|
| 5,126,999 A * | 6/1992 | Munter et al. ............... 370/415 |
| 5,500,858 A | 3/1996 | McKeown ................... 370/60 |
| 5,689,508 A | 11/1997 | Lyles |
| 5,745,489 A * | 4/1998 | Diaz et al. ............... 370/395.7 |
| 5,748,614 A * | 5/1998 | Wallmeier ............. 370/395.41 |
| 5,758,104 A * | 5/1998 | Gujral et al. ................ 710/107 |
| 5,786,917 A * | 7/1998 | Maeno ........................ 398/51 |
| 5,805,589 A * | 9/1998 | Hochschild et al. ......... 370/389 |
| 6,072,772 A * | 6/2000 | Charny et al. ............... 370/229 |
| 6,477,174 B1 * | 11/2002 | Dooley et al. .............. 370/416 |
| 6,563,837 B1 * | 5/2003 | Krishna et al. ............. 370/413 |
| 6,611,522 B1 * | 8/2003 | Zheng et al. .......... 370/395.21 |
| 6,625,121 B1 * | 9/2003 | Lau et al. .................... 370/230 |
| 6,647,019 B1 * | 11/2003 | McKeown et al. ......... 370/422 |
| 6,735,212 B1 * | 5/2004 | Calamvokis ................ 370/412 |
| 6,829,647 B1 * | 12/2004 | Biran et al. ................. 709/229 |

FOREIGN PATENT DOCUMENTS

| EP | 0749072 A2 * | 12/1996 |
|---|---|---|
| EP | 0 817 434 | 1/1998 |

(Continued)

OTHER PUBLICATIONS

Goke et. al., Banyan Networks for Partitioning Multiprocessor Systems, date 1973, Proceedings of the First Annual Symposium on Computer Architecture, pp. 100-107.*

(Continued)

*Primary Examiner*—Doris H. To
*Assistant Examiner*—Robert W. Wilson
(74) *Attorney, Agent, or Firm*—Nath & Associates PLLC; Harold L. Novick

(57) ABSTRACT

A centralized arbitration mechanism provides that a router switch fabric is configured in a consistent fashion. Remotely distributed packet forwarding modules determine which data chunks are ready to go through the optical switch and communicates this to the central arbiter. Each packet forwarding module has an ingress ASIC containing packet headers in roughly four thousand virtual output queues. Algorithms choose at most two chunk requests per chunk period to be sent to the arbiter, which queues up to roughly 24 requests per output port. Requests are sent through a Banyan network, which models the switch fabric and scales on the order of NlogN, where N is the number of router output ports. Therefore a crossbar switch function can be modeled up to the 320 output ports physically in the system, and yet have the central arbiter scale with the number of ports in a much less demanding way. An algorithm grants at most two requests per port in each chunk period and returns the grants to the ingress ASIC. Also for each chunk period the central arbiter communicates the corresponding switch configuration control information to the switch fabric.

100 Claims, 6 Drawing Sheets

FOREIGN PATENT DOCUMENTS

WO        WO 99/35577        7/1999

OTHER PUBLICATIONS

Goke et. al., Banyan Networks for Partitioning Multiprocessor Systems, dated 1973, Proceedings of the First Annual Symposium on Computer Architecture, pp. 100-107.*
European Search Report, dated Feb. 9, 2004, 4 pages.
U.S. Appl. No. 09/703,057, Brewer et al.
U.S. Appl. No. 09/703,038, Brewer et al.
U.S. Appl. No. 06/702,958, Brewer et al.
U.S. Appl. No. 09/703,027, Blackmon et al.
U.S. Appl. No. 09/703,043, Blackmon et al.
U.S. Appl. No. 09/703,064, McDermott, III et al.
Waldvogel, Marcel et al; Scalable High Speed IP Routing Lookups; Computer Engineering and Networks Laboratory; ACM, Inc. 1997.
M40 Internet Backbone Router; Juniper Networks.
Partridge, Craig et al.; A 50-Gb/s IP Router; IEEE/ACM Transactions on Networking; vol. 6 No. 3, pp. 237-248; Jun. 1998.
McKeown, Nick et al.; Achieving 100% Throughout in an Input-Queued Switch; IEEE 1996.
McKeown, Nick; Fast Switched Backplane for a Gigabit Switched Router; Department of Electrical Engineering; Stanford University, CA.
McKeown, Nick; The iSLIP Scheduling Algorithm for Input-Queued Switches, Department of Electrical Engineering, Stanford University, CA.

* cited by examiner

SYSTEM AND METHOD FOR ROUTER CENTRAL ARBITRATION

RELATED APPLICATIONS

This application is related to concurrently filed, co-pending, and commonly assigned U.S. application Ser. No. 09/703,057, entitled "System And Method For IP Router With an Optical Core," to concurrently filed, co-pending, and commonly assigned U.S. application Ser. No. 09/703,038, entitled "System and Method for Router Data Aggregation and Delivery," to concurrently filed, and commonly assigned U.S. application Ser. No. 09/702,958, now U.S. Pat. No. 6,711,357, entitled "Timing and Synchronization for an IP Router Using an Optical Switch," to concurrently filed, co-pending, and commonly assigned U.S. application Ser. No. 09/703,027, entitled "Router Network Protection Using Multiple Facility Interfaces," to concurrently filed, and commonly assigned U.S. application Ser. No. 09/703,043, entitled "Router Line Card Protection Using One-for-N Redundancy" now issued as U.S. Pat. No. 6,879,559 on Apr. 12, 2005, and to concurrently filed, and commonly assigned U.S. application Ser. No. 09/703,064, entitled "Router Switch Fabric Protection Using Forward Error Correction," now issued as U.S. Pat. No. 6,894,970 on May 17, 2005, the disclosures of which are incorporated herein by reference.

TECHNICAL FIELD

This application relates to the field of optical communication networks, and particularly to large-scale routers for optical communication networks.

BACKGROUND

A router system with a centralized switch fabric at its core requires that the entire switch be configured in an internally consistent way. A fabric is a collection of devices which cooperatively provide a general routing capability. In order to scale to a large router with several hundred ports, it is necessary to have a router switch fabric with uniform scaling properties. One example of a fabric with these properties is a centralized crossbar. Electrical crossbars typically have scalability limitations, limiting the size to tens of ports at a maximum. Previous IP routers have been unable to take advantage of optical switch technology due to their size and reconfiguration speed limitations. In order to utilize an optical switch for the fabric of an IP router, the fabric must be able to change configurations quickly enough to efficiently route the shortest IP packet, within on order of tens of nanoseconds. Present optical switch technology requires milliseconds for reconfiguration. Additionally, present optical switch technology is severely limited to just a small number of ports, such that an optical switch is unable to scale to large numbers of inputs and outputs.

In order to scale to larger systems, prior routers have resorted to distributed switching fabrics. These fabrics typically have multiple arbitration points to traverse the fabric, resulting in increased fabric latency and congestion hot spots within the fabric. Multiple packet forwarding modules are distributed around such a system in remote racks. The packet forwarding modules are responsible for organizing data packets from the input ports to be passed through the switch fabric.

In a future large router system, the number of input and output ports can reach several hundred. Packet forwarding modules are remotely distributed over a wide area. Complex switching is required, with long latency or delay times in passing information through the router system accurately with a high throughput. In such an environment, an arbitration system is needed to handle high data throughput and provide a consistently high connection rate of data with the switch fabric.

SUMMARY OF THE INVENTION

The present invention is directed to a system and method of central arbitration in a large, remotely distributed router system, which handles high data throughput and provides a consistently high connection rate of data with the switch fabric.

The central core of the router includes a switch fabric, preferably an optical switch. All information moves through the switch in chunks, where a chunk is defined as a uniformly sized unit of information that passes through a router switch fabric during one switch cycle. A chunk in a preferred embodiment is 330 nanoseconds long and contains 400 bytes of payload information and on the order of 50 bytes of overhead, for example headers and trailers. After a chunk passes through the router switch, then before another chunk can pass through, the switch configuration is typically changed.

Within each switch cycle there is a segment of time during which chunks of information go through the switch and another segment of time during which the switch is reconfigured (new set of input/output ports) for a next chunk. These two segments of a switch cycle, termed respectively "dark period" during which the switch is reconfigured and essentially no information passes through it and "light period" during which information passes through the switch, are collectively termed a "chunk period".

A preferred embodiment has a centralized optical switch at its core. A centralized arbitration mechanism provides that the entire switch is configured in a consistent manner. The centralized arbitration mechanism includes a central arbiter and a number of interface units that interface to all of the line shelves in the system. The packet forwarding modules are distributed around the system in remote line shelves. These remotely distributed packet forwarding modules determine which chunks are ready to go through the optical switch and must communicate this to the centralized arbitration system in such a way as to maximize the number of connections through the optical switch.

Each packet forwarding module has an ingress ASIC containing a number of virtual output queues. The number of these output queues is very large, on the order of 4 thousand per ingress ASIC. A number of algorithms choose which among all those queues holds the highest priority chunk that is ready to be passed through the optical switch. The algorithms can pick at most two chunk requests per chunk period to be sent to the arbiter shelf to have central arbitration applied. Requests are then forwarded to a central arbiter shelf, which examines all the requests to determine a switch configuration which yields a high connection rate through the optical switch. The distance between the line shelf and the arbiter shelf produces multiple chunk periods of delay. Accordingly, to maintain the required pipeline efficiency, sufficient chunk requests must be sent to the arbiter shelf such that some unknown number requests will be in flight while others are being processed by the central arbiter. This problem is addressed by buffering at the arbiter shelf.

The central arbiter queues those chunk requests, such that it maintains a supply of requests ready for arbitration. The number typically is on the order of 16 to 24 requests per input port. If there are 320 ports on the central arbiter, and each port has 16 to 24 requests, then the central arbiter must examine roughly 4 thousand chunk requests per chunk period. A further complexity is that the optical switch itself is a crossbar. Crossbars scale on the order of N (squared), where N is the number of switch ports, which would exceed the gate capacity of most ASICs to model that function. In accordance with the present invention, the crossbar optical switch is modeled in the central arbiter using a Banyan network, which scales on the order of NlogN. Therefore the crossbar function can be modeled up to the 320 physical output ports in the system, and yet have the central arbiter scale with the number of ports in a much less demanding way.

The central arbiter ASIC applies an algorithm to the requests, such that during each chunk period at most two of the requests are granted per port. The grants then follow the request path back to the ingress ASIC. Also during each chunk period the corresponding switch configuration information is communicated from the central arbiter ASIC to the optical switches to provide the required switch connections.

Various aspects of the invention are described in concurrently filed, co-pending, and commonly assigned U.S. application Ser. No. 09/703,057, entitled "System And Method For IP Router With an Optical Core," concurrently filed, co-pending, and commonly assigned U.S. application Ser. No. 09/703,038, entitled "System and Method for Router Data Aggregation and Delivery," concurrently filed, co-pending, and commonly assigned U.S. application Ser. No. 09/702,958, now U.S. Pat. No. 6,711,357, entitled "Timing and Synchronization for an IP Router Using an Optical Switch," concurrently filed, co-pending, and commonly assigned U.S. application Ser. No. 09/703,027, entitled "Router Network Protection Using Multiple Facility Interfaces," concurrently filed, co-pending, and commonly assigned U.S. application Ser. No. 09/703,043 "Router Line Card Protection Using One-for-N Redundancy" now issued as U.S. Pat. No. 6,879,559 on April 12, 2005, and concurrently filed co-pending, and commonly assigned U.S. application Ser. No. 09/703,064, entitled "Router Switch Fabric Protection Using Forward Error Correction," now issued as U.S. Pat. No. 6,894,970 on May 17, 2005, the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
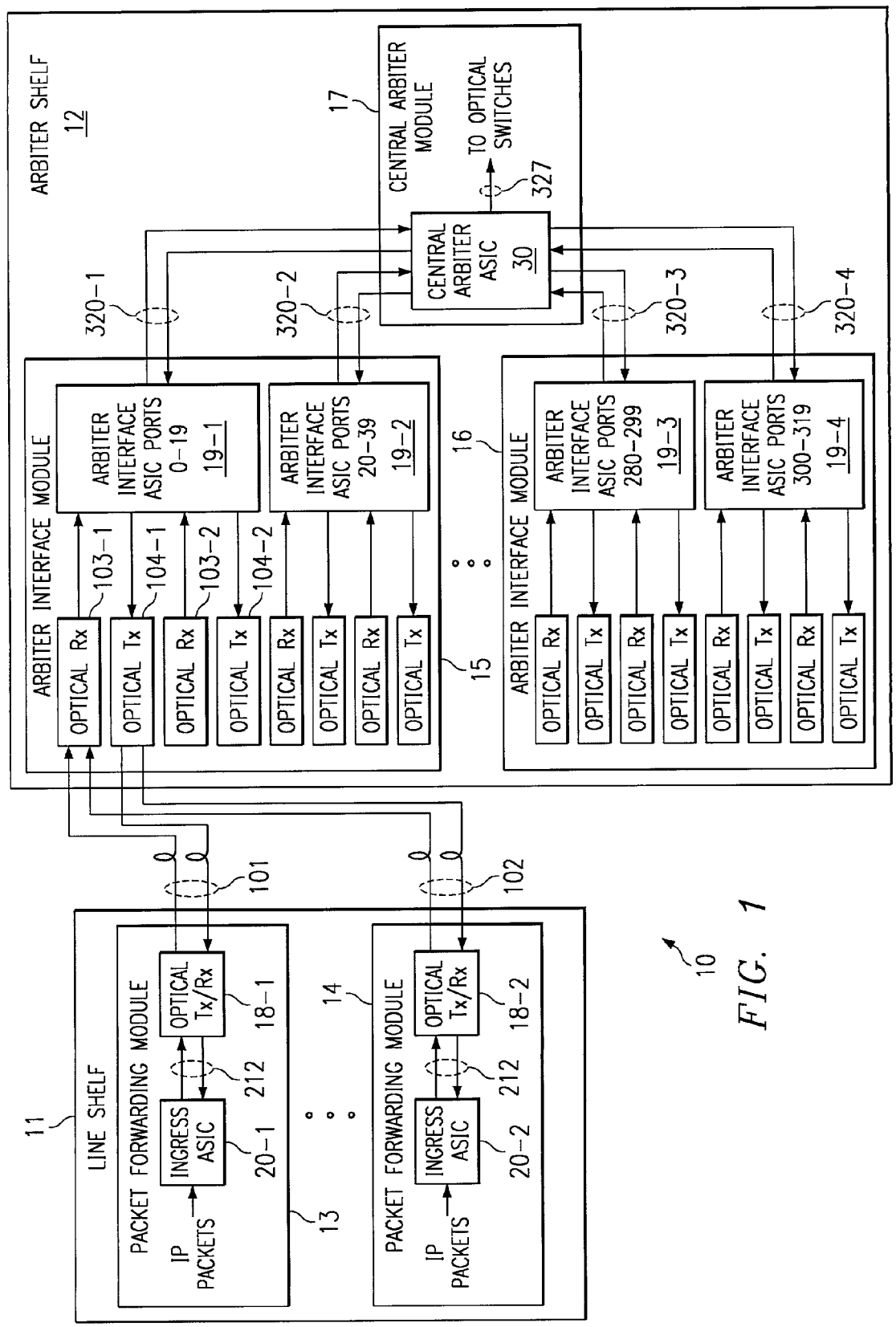
FIG. 1 is an overview logic diagram of a router arbitration structure, in accordance with an embodiment of the present invention.

FIG. 1 is an overview logic diagram of a router arbitration structure, in accordance with an embodiment of the present invention. A line shelf 11 contains multiple packet forwarding modules 13 and 14 in the present example. Generally multiple line shelves are remotely distributed through a router system. Packet forwarding modules 13, 14 include respective ingress ASICs 20-1 and 20-2 interconnected with respective optical transceivers 18-1 and 18-2 through electrical links 212. Transceiver 18-1 is interconnected through optical links 101 with an optical receiver 103-1 and an optical transmitter 104-1 contained in an arbiter interface module (AIM) 15 located in an arbiter shelf 12. Also contained in AIM 15 and interconnected with optical receiver 103-1 and optical transmitter 104-1 is an arbiter interface ASIC 19-1. Arbiter shelf 12 further includes a central arbiter ASIC 30 within a central arbiter module 17. Central arbiter ASIC 30 is interconnected with AIM 19-1, 19-2 through respective links 320-1 and 320-2 and with the router switch fabric, preferably an optical switch fabric (not shown) through links 327. A fabric is a collection of devices which cooperatively provide a general routing capability. One example of a fabric with these properties incorporates a centralized crossbar.

Figure 2:
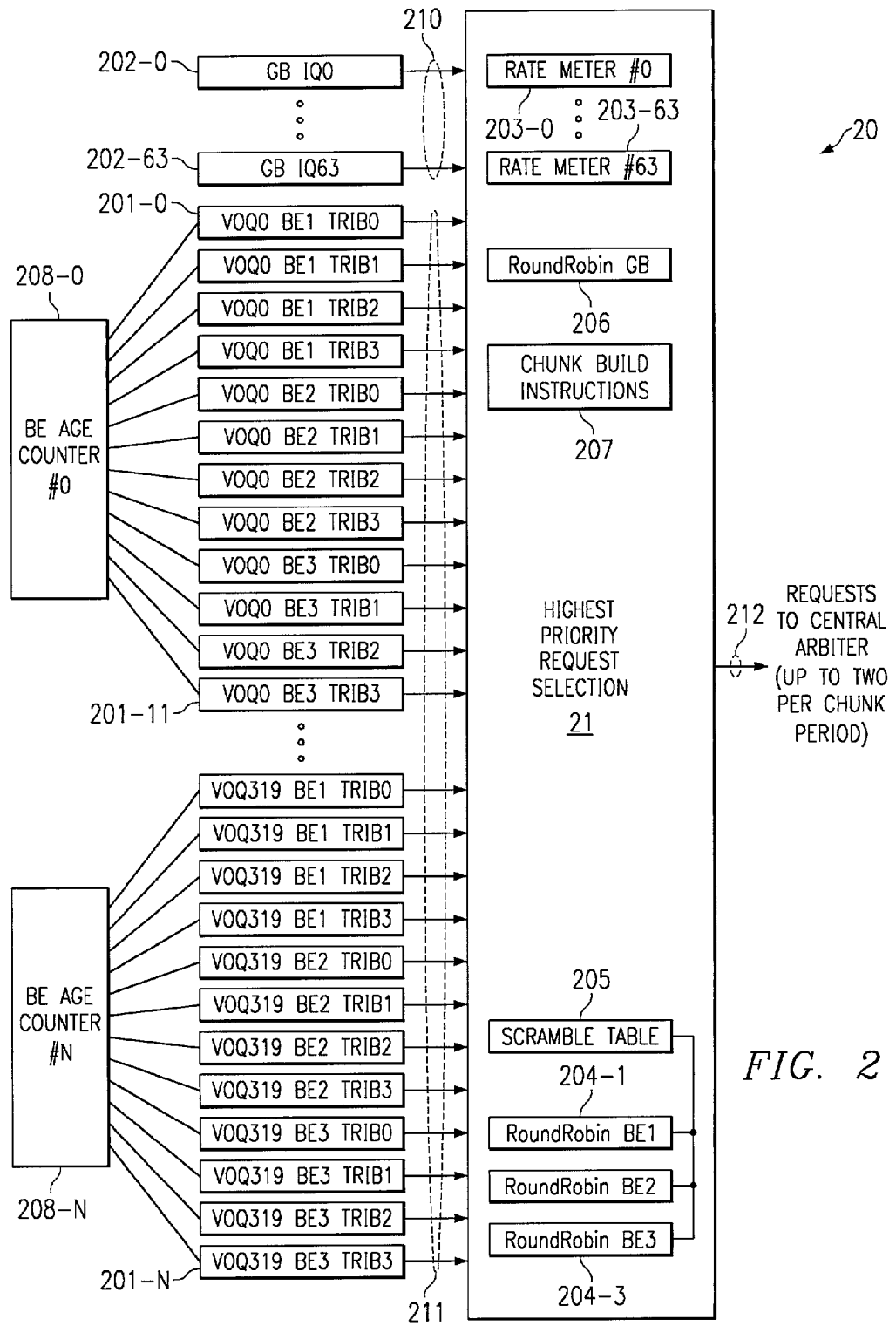
FIG. 2 is a block diagram illustrating the internal logic structure for the ingress ASIC of FIG. 1.

FIG. 2 is a block diagram illustrating an internal logic structure 20 for ingress ASIC 20-1 of FIG. 1. Ingress ASIC 20 contains multiple virtual output queues organized according to which of two quality of service (QOS) types is performed, namely guaranteed bandwidth (GB) queues 202-0 through 202-63 and best effort (BE) queues 201-0 through 201-N. Virtual output queues 201-0 through 201-N and 202-0 through 202-63 are each directly connected to a highest priority request selection block 21, which in turn is interconnected with arbiter interface ASIC 19-1 through links 212.

Figure 3:
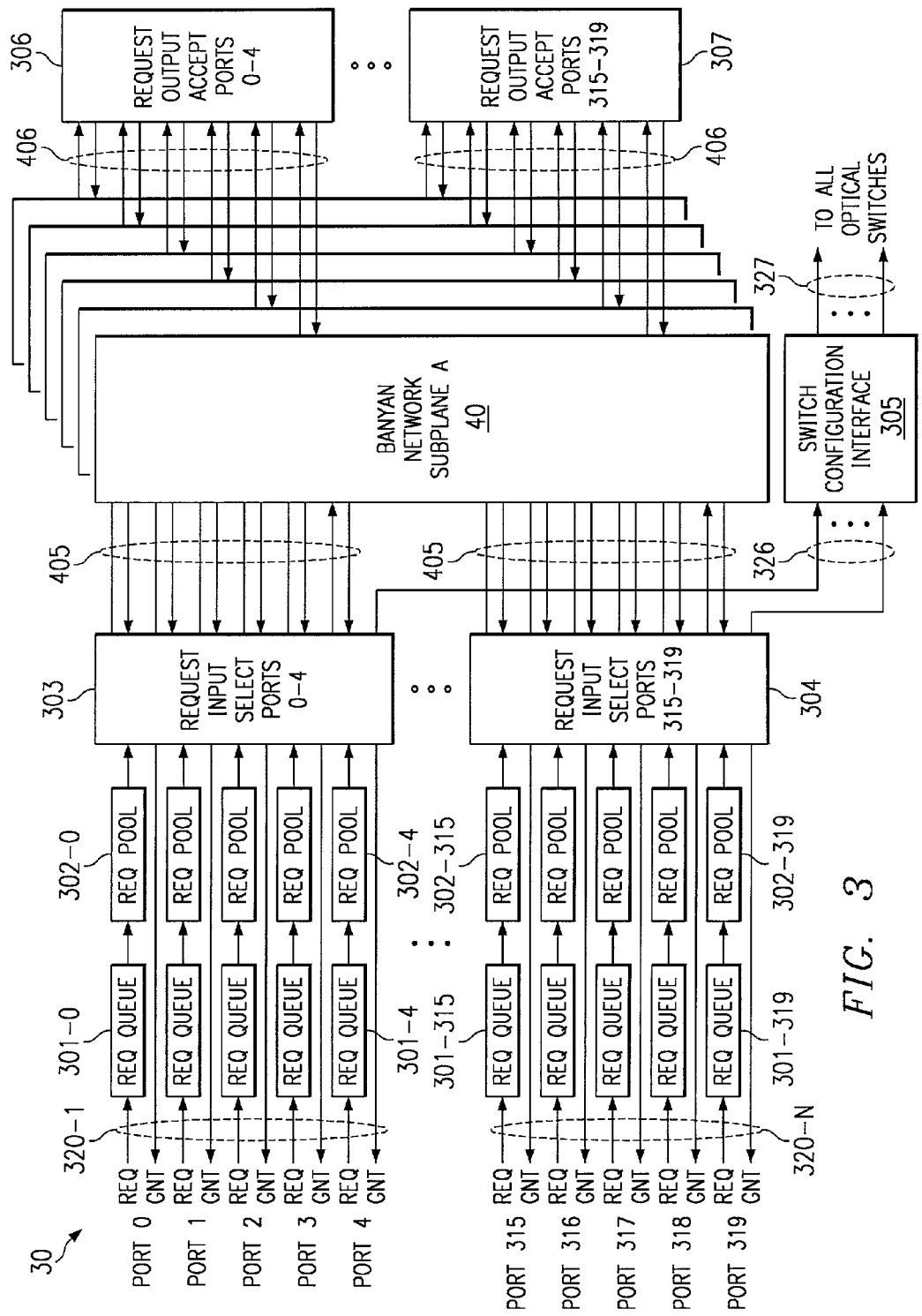
FIG. 3 is a block diagram illustrating internal logic structure within a central arbiter ASIC, in accordance with an embodiment of the present invention.

FIG. 3 is a block diagram illustrating an internal logic structure within central arbiter ASIC 30. Each input port of the router system is represented by a particular input channel in central arbiter ASIC 30. The input channels contain for example respective request queues 301-0 through 301-319, such that each request queue is interconnected with arbiter interface ASICs 19-1 through 19-4 through links 320 and with request input select blocks 303, 304 through respective request pools 302-0 through 302-319. Request input select blocks 303, 304 are interconnected through links 405 with a Banyan network 40, which is configured to model the router switch fabric. Banyan network 40 is in turn interconnected through links 406 with request output accept blocks 306, 307 configured to represent each output port of the router system. Request input select blocks 303, 304 are additionally connected with a switch configuration interface 305, which is interconnected through links 327 with the router switch fabric. Also connected to switch configuration interface 305 are links (not shown in FIG. 3) from output request accept blocks 306, 307.

Referring again to FIG. 1, packet forwarding modules (PFMs) 13, 14 are responsible for receiving incoming information packets, determining their output destination within the router, and storing those packets in virtual output queues until they are ready to be sent through the router switch fabric. Ingress ASIC 20-1 examines the contents of the queues, determines the priority of data to be sent through the switch fabric, and acts on that highest priority determination by sending requests through links 212 and through optical transceiver 18-1 and links 101, 102 to arbiter interface modules (AIMs) 15 and 16 in arbiter shelf 12. There are multiple AIMs within arbiter shelf 12, because there is limited interconnect space on the back panel of any single AIM, limiting the number of optical links that can be connected to a single AIM. Each AIM contains two arbiter interface ASICs, for example ASICs 19-1 and 19-2, as well as multiple optical receivers 103 and transmitters 104. Arbiter interface ASICs 19-1, 19-2 receive requests through optical receivers 103 and pass them to central arbiter ASIC 30 through links 320-1 through 320-4. There is only one active central arbiter in the router system.

In the present embodiment all information moves through the router switch fabric in chunks. A chunk is a fixed uniform quantity of information, in this particular embodiment 330 nanoseconds long, that is passed through the router switch fabric during one switch cycle. In the preferred embodiment, a chunk contains 400 bytes of payload information and on the order of 50 bytes of overhead, for example headers and trailers. After a chunk passes through the router switch fabric, then before another chunk can pass through, the switch configuration must typically be changed.

In each switch cycle there is a segment of time during which information chunks pass through the router switch and another segment of time during which the switch fabric is reconfigured (new set of input/output ports) for a next chunk. These two segments of a switch cycle, termed respectively "dark period" during which the switch fabric is reconfigured and essentially no information passes through it and the "light period" during which information passes through the switch, are together termed a "chunk period".

Referring to FIG. 2, ingress ASIC 20-1 selects from among multiple virtual output queues 201-0 through 201-N and 202-0 through 202-63 the queues having the highest priority information packets for forming into chunks to pass through the router switch fabric. These queues have been presorted into guaranteed bandwidth (GB) queues 202-0 through 202-63 and best effort (BE) queues 201-0 through 201-N. In each queue, what are actually stored are head and tail pointers to the actual data storage location in separate RAM external to ingress ASIC 20-1, as well as information regarding the size of the queue and other parameters for performing arbitration across all queues.

Guaranteed bandwidth queues are pre-provisioned quality of service (QOS) flows in which software provisions rate metering, which determines the bandwidth that is allocated to each guaranteed bandwidth flow. Rate metering is performed by rate meter blocks 203-0 through 203-63 in highest priority request selection block 21. Tokens are added to a rate meter according to a predetermined procedure, and are deducted when a request is issued for data in the corresponding queue to pass through the router switch fabric.

Figure 6:
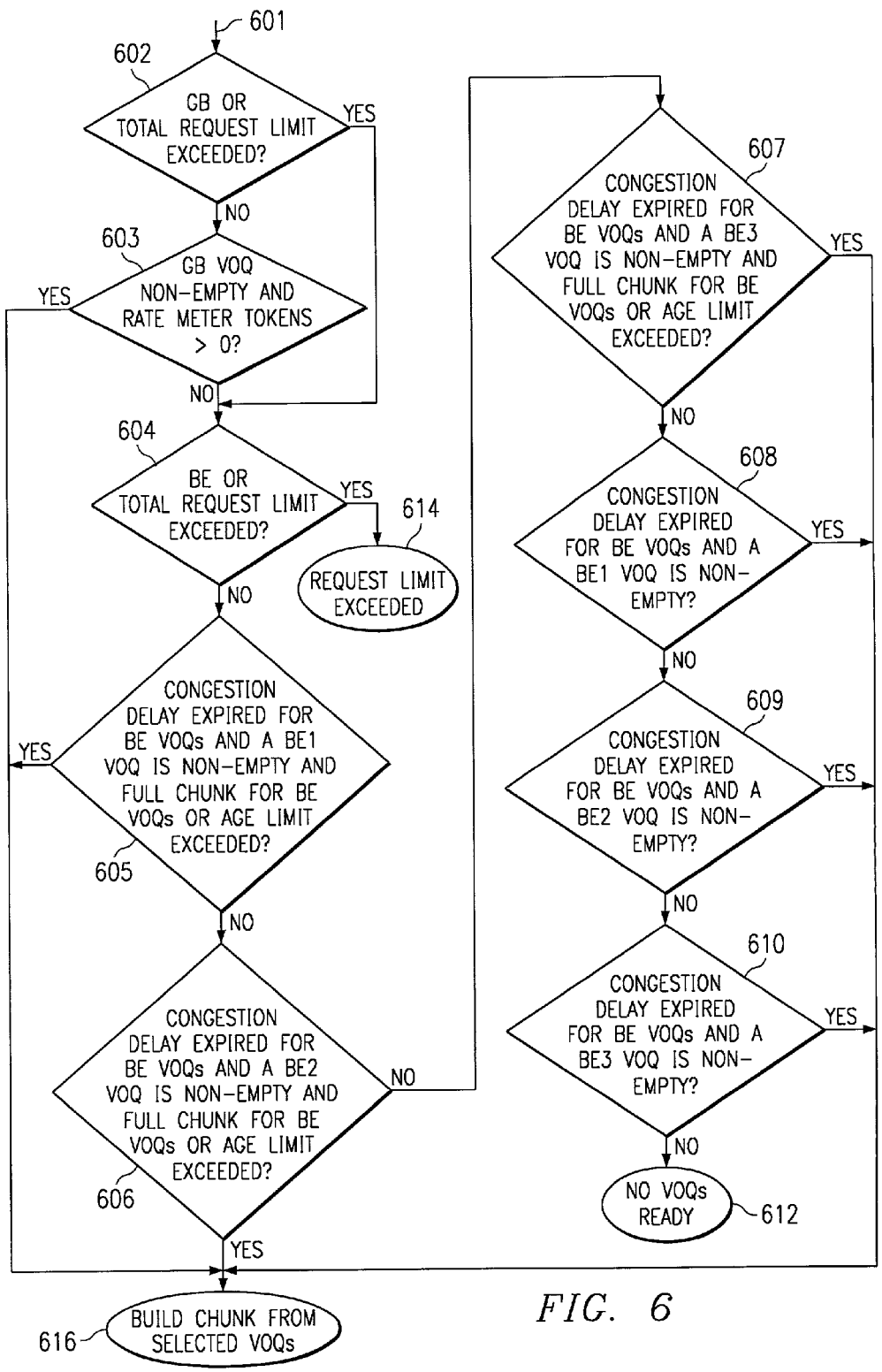
FIG. 6 is a scheduling decision diagram illustrating an algorithm used to select a highest priority request.

FIG. 6 is a scheduling decision diagram illustrating an algorithm used by highest priority request selection block 21 to select a highest priority request. Ingress ASIC 20-1 in highest priority request selection block 21 maintains three counts of the number of outstanding requests that have gone out but have not yet been granted, one count for the number of outstanding guaranteed bandwidth requests, a second count for the number of outstanding best effort requests, and a third count for the total number of outstanding requests (guaranteed bandwidth and best effort). In the present embodiment, the GB and BE outstanding request limits are each 18 and the total outstanding request limit is 20. Setting the GB and BE outstanding request limits each to less than the total outstanding request limit ensures that some bandwidth is available for each QOS level of traffic. None of the three counters can exceed its predetermined maximum limit of outstanding requests to the central arbiter.

At step 602 the algorithm makes sure that the maximum limit of outstanding guaranteed bandwidth requests or total requests to the central arbiter is not exceeded. If the total outstanding maximum limit is for example 20, then once the total outstanding request count reaches 20, the algorithm proceeds to step 604. Likewise, if the guaranteed bandwidth limit is 18 and the guaranteed bandwidth outstanding request count reaches 18, the algorithm proceeds to step 604. If neither the guaranteed bandwidth outstanding request limit nor the total outstanding request limit are reached at step 602, then at step 603 the algorithm proceeds to examine guaranteed bandwidth queues 202-0 through 202-63. A round robin GB indicator 206 in highest priority selection block 21 is used to indicate the highest priority guaranteed bandwidth queue to be checked. As an example, if round robin GB indicator 206 has the value 12, then the priority order for the guaranteed bandwidth queues is (from highest to lowest) 12, 13, . . . , 63, 0, 1, . . . , 11. When a guaranteed bandwidth request is selected, then round robin GB indicator 206 specifies the virtual output queue immediately next in order as the new highest priority queue. Virtual output queues are assigned priority based on the priority list specified by round robin GB indicator 206. If there is some content in a queue, the algorithm checks that the rate meter still contains some tokens, i.e., that it has not exhausted its allocated bandwidth. If the queue has content and has not exhausted its allocated bandwidth, then as indicated at step 603 of FIG. 6, that particular guaranteed bandwidth queue sends a request to the central arbiter, provided that a maximum of two requests per chunk period has not been exceeded for each ingress ASIC in the router system. Generally each of the 64 guaranteed bandwidth queues is destined for a different router output port.

Once a guaranteed bandwidth virtual output queue is selected for a request, at step 616 all information needed to generate the eventual data chunk that will be sent through the router switch fabric is placed in a chunk build instructions structure 207, which accommodates sufficient entries for the maximum number of outstanding requests to the central arbiter. When a grant is received from the central arbiter, the appropriate data chunk build instructions are obtained from the chunk build instruction structure 207. A data chunk from guaranteed bandwidth requests is built from packets represented in a single virtual output queue. If packets in the selected queue cannot fill the chunk completely, then the chunk remains only partially filled. Packets from guaranteed bandwidth queues are never mixed with packets from best effort queues into a single data chunk. This allows guaranteed bandwidth requests to pass best effort requests destined to the same output port during central arbitration.

Best effort queues 201-0 through 201-N, used for traffic having lower priority than guaranteed bandwidth, are further subdivided into best effort 1 through best effort 3 priorities. For each output port of the router there are 12 virtual output queues organized into three best effort levels each having up to 4 tributaries. Best effort data chunks are filled with packets from all 12 virtual output queues destined to the same output port.

Best effort queues require an arbitration approach different from that for guaranteed bandwidth queues. Referring to FIG. 6, once the algorithm has run through all of the guaranteed bandwidth queues in steps 602 and 603 and determined that fewer than two requests have been made and thus that allowable requests are still available, then the algorithm at step 604 examines the counters which hold the number of outstanding BE requests and the total number of outstanding combined GB and BE requests. If either count has reached its predetermined limit, no further requests are available, as indicated at step 614. However, if neither count has reached its limit, then the algorithm proceeds at step 605 to examine the best effort queues, beginning with highest (best effort 1) priority, to determine if any queues contain 400 bytes of information which would fill a chunk to be sent through the router switch fabric. Accordingly, the algorithm looks at the 12 best effort queues associated with a common destination port, e.g., queues 201-0 through 201-11. If for example those combined queues were able to fill a chunk, then that would have high priority for a request. At step 605 the algorithm applies a round robin procedure sequentially through all of the best effort 1 destination ports, based on at least one best effort 1 queue having content and the sum of packets represented in BE1 through BE3 queues filling a chunk. The algorithm uses round robin best effort blocks 204-1 through 204-3 to select the highest priority queue within each best effort class.

At step 605 the algorithm applies additional criteria other than whether a queue is full, for example whether a queue has been partially filled for a long enough period of time, such that it is time to send it out. For this purpose a timeout mechanism on the best effort queues ensures that data goes out without spending too much time in a queue. Typically different time out limits are applied to best effort 1, best effort 2 and best effort 3 virtual output queues respectively. A single best effort aging counter 208 is used for the 12 queues of each destination output port. Best effort aging counter 208 is initialized with an aging time out value when one of the 12 associated queues receives a packet. The initialized value of the aging time out is dependent on the QOS level of the received packet. Higher priority packets initialize the aging time out counter with a lower time out value. Best effort aging counter 208 is decremented periodically to the value zero. If a packet for a higher priority best effort class is received prior to the counter timing out, then best effort aging counter 208 is reinitialized to the new, higher priority time out value, provided that the new value would cause an earlier time out to occur. Once best effort aging counter 208 reaches zero, then the associated output port receives priority as if it were able to completely fill a chunk. Accordingly, once the algorithm has gone through all the best effort 1 queues at step 605 to determine if any of those queues are either full or have timed out, it then applies the same criteria sequentially to all of the best effort 2 queues at step 606. After all the best effort 2 queues are examined, then at step 607 the algorithm looks at best effort 3 queues sequentially to determine if best effort 3 queues can fill a chunk or have timed out.

If at that point the algorithm still has not filled the limit of two requests that can be made per chunk period from highest priority request selection logic 21, the round robin mechanism is applied again. This time the algorithm only requires that there is anything at all in a queue, ignoring the requirement that the content of the queue must fill a chunk. This process is applied sequentially at first to best effort 1 queues at step 608, then to best effort 2 queues at step 609, and finally to best effort 3 queues at step 610. In summary, at each chunk period highest priority request selection logic 21 can choose up to two requests to send to central arbiter ASIC 30, provided that the allowable maximum number of outstanding requests is not exceeded. If the chunk limit is exceeded (step 614) or no chunks are available (step 612), then no action needs to be performed until the algorithm is retried on the next chunk period.

As described above, once a chunk request is selected, chunk building instructions are created and held in chunk build instructions structure 207 within ingress ASIC 20. The chunk building instructions specify each packet that is to be placed within a chunk. Since a chunk payload is 400 bytes in length and the minimum IP packet size is 40 bytes, chunk building instructions can specify up to 10 packets to be placed in a data chunk.

When a packet must be segmented to fill a chunk, the first segment can be used to complete a partially filled data chunk. The remaining packet segments (provided that greater than one segment remains) are used to form a multi-chunk request. Multi-chunk requests are advantageous for two reasons. First, they allow central arbiter ASIC 30 to maintain a larger number of potential chunk requests within its input request pool 302-0 through 302-N. A larger number of requests in the input request pool results in better efficiency of the central arbitration algorithm. Second, multi-chunk requests are used by the central arbiter ASIC 30 to limit the total number of packets which need multi-chunk reassembly at each destination port. As an example, the present limitation is 16 multi-chunk requests being reassembled at each destination port.

A multi-chunk request is generated whenever the highest priority request selection block 21 selects a destination port that results in creating chunk build instructions with the first packet of the chunk being larger than a single chunk segment. When this occurs, separate chunk build instructions are generated for each individual packet segment. The entire multi-chunk request counts as one request being sent to the central arbiter ASIC 30, allowing a second request to be selected for that chunk period.

Since 12 virtual output queues are destined for the same output port, the algorithm performing chunk building must choose which order to search the queues for available packets. The algorithm first must check if a partial packet remains from a previous selection to this output port. A partial packet has highest priority, independent of any other queues having ready packets. Partial packets have highest priority to minimize the memory space required by the output port to perform packet reassembly. If no partial packet exists, or if additional space exists in a chunk after the partial packet is completed (possibly a multi-chunk request), then the chunk building algorithm must search for new packets. The algorithm searches in order of best effort class priority, best effort 1 through best effort 3. The tributary queues within a best effort class have equal priority, requiring a round robin selection process to be performed. Three round robin tributary indicators consisting of one round robin tributary indicator per best effort class exist per destination port. Individual round robin tributary indicators per best effort class are needed to ensure virtual output queue selection fairness.

The round robin best effort blocks 204-1 through 204-3 are used to ensure fairness when determining which destination port to select. However, this could result in a system synchronization overload in which every ingress ASIC 20 in the system issues requests to the central arbiter in exactly the same order at the same time. The result is poor central arbiter algorithm efficiency due to an insufficient variety of input requests. Due to this system synchronization overload potential, each ingress ASIC 20 in the system includes a scramble table 205. Scramble table 205 specifies the priority order for the destination ports that is used by round robin best effort blocks 204-1 through 204-3. This scrambling function prevents central arbiter congestion due to system synchronization overload.

In some embodiments, each scramble table entry 205 specifies a set of 12 virtual output queues (VOQs) that is assigned to a particular destination port. On each PFM the scramble table is initialized differently. Received packets are placed in the VOQs using the scramble table. The round robin mechanism then gives priority in the normal round robin increasing order (wrapping back to zero) to a scrambled sequence of VOQs. An unscramble table is then used to determine the actual physical port assigned to a set of VOQs selected for an issued request. This procedure simplifies the round robin mechanism, since it only requires scrambling the assignment of packets going into the VOQs and unscrambling them coming out. Scramble table 205 maps output ports to VOQ sets. As an example, a scramble table having as the first few entries "2, 34, 56, 5, 102, . . . ", uses the output port value as an index, such that packets destined for output port 2 would be stored in VOQ set 56 (table indexed to zero). After ingress ASIC 20 has performed its scheduling algorithm and has selected VOQ set 56 as highest priority to send a request to the central arbiter, the unscramble table is used by ingress ASIC 20 to reverse map the scrambled VOQ set 56 to the actual output port number 2 in the request. This process allows the central arbiter to process requests with their actual output port assignments. When a grant is received from the central arbiter for output port 2, ingress ASIC 20 again uses the value 2 as the index into scramble table 205 to locate the VOQ set 56, where the packets are to be obtained to fill a chunk.

A second cause for central arbiter congestion is unbalanced output load of traffic to the router system. This normally occurs to some degree at all times, when the sum of the traffic for an output port is greater than that output port can handle. This situation can occur either because the output port is capable of only a small bandwidth or because of a huge amount of input traffic for a single output port. The situation can be a long term persistent problem, or a very short term intermittent (or burst) problem. The impact on the system is central arbiter congestion (i.e. too many requests within central arbiter ASIC 30 all destined for the same output port.)

Highest priority request selection block 21 handles central arbiter congestion by monitoring the time delay between issuing a request to central arbiter ASIC 30 and receiving the corresponding grant for that request. There is a strong correlation between the amount of time it takes for a grant to be issued and the number of requests within the central arbiter for a specific output port. The grant time is dependent on other factors, but to a much lesser extent. Having a centralized arbitration mechanism allows ingress ASIC 20 to have knowledge of the congestion level for each output port of the system.

Ingress ASIC 20 uses the grant delay information to throttle issuing requests for congested output ports as an effective means to manage central arbiter congestion. The algorithm is as follows:

grantDelta=grantDelay–(3/4*outstandinggrant)–GrantDelayThreshold;
requestDelay=
(requestDelay*RequestDelayAverageSpan)+(grantDelta* RequestGrantDeltaRatio);

The algorithm generates a grantDelta by subtracting the expected grant delay and subtracting a threshold value from the grant's delay value. The expected grant delay is a function of the number of outstanding grants at the time the request is issued, where multi-chunk requests have multiple outstanding grants. The grant delay threshold specifies the highest acceptable delay from normal levels of congestion. The algorithm then multiplies the grantDelta by a request/grant ratio constant. This constant specifies the ratio of grant delay to the amount of delay for future requests to the same output port. The resulting value is time averaged over a predetermined number of request/grant delay samples. A running time average is maintained and used by highest priority request selection block 21.

Each time a request is selected, a requestStart counter associated with that output port is initialized to the current requestDelay value multiplied by the number of chunks in the current chunk request (multi-chunk requests have values greater than one). The counter is decremented each chunk period. Once the requestStart counter has reached zero, then the output port is eligible to be selected by the highest priority request selection block 21. Prior to reaching zero, the output port is not eligible to be selected, independent of whether there is a full chunk available, or whether its aging time out has expired.

In the router system described above, for 320 output ports there are 12 VOQs per destination port, organized as 3 QOS levels by 4 tributaries. In some embodiments, the same overall number of VOQs are reconfigured with minimal performance degradation to support a 640 port router system, such that for each of 640 destination ports there are 6 queues organized as 3 QOS levels by two tributaries.

Referring to FIG. 3, central arbiter ASIC 30 receives the requests that were issued from ingress ASIC 20-1 through links 320-1. The requests are then loaded into request queue 301-0, for example, which then fills request pool 302-0 with requests. Request pool 302-0 accommodates a limited number of requests, on the order of 8 requests at any one time. The arbitration algorithm works most efficiently if the request pool is filled with requests, and thus ingress ASIC 20-1 typically sends more than 8 requests outstanding in order to keep the request pool filled despite the pipeline latency or delay between launching a request and receiving a grant back at ingress ASIC 20-1. The intent of request queue 301-0 is to accommodate any excess outstanding requests that would otherwise overflow the capacity of request pool 302-0. For example, if there are a total of 20 requests outstanding in the channel and only 8 maximum in the request pool, there are 12 additional requests in the channel. Some of those requests and grants are typically in transition in the pipeline to and from central arbiter ASIC 30.

The number of requests in request queue 301-0 is accordingly between zero and twelve. Request queue 301-0 and request pool 302-0 buffer the flow of requests from ingress ASIC 20-1 to central arbiter ASIC 30.

When a new BE request is placed in the same request pool with an already existing BE request having the same destination, then the new BE request is prohibited from being selected to enter the Banyan network, thus ensuring that chunk requests with the same source and destination must be granted in the order of arrival into the request pool. However, the priority of the existing BE request is elevated to the highest priority of all requests in the request pool with the same destination. This mechanism enhances the probability that the existing BE request is accepted at the Banyan output accept logic and thus clears the way for examination of the new BE request.

For example, a new BE1 priority level request enters a request pool already containing an existing BE3 priority level request having the same destination. Since BE requests are not allowed to pass other BE requests, a grant must be issued for the existing BE3 request before considering the new BE1 request. However, while both BE requests are waiting in the request pool, the existing BE3 request is elevated to the same BE1 priority as the higher priority new BE1 request, thus enhancing the probability of examination and acceptance of the existing BE request at the Banyan output accept logic and reducing the waiting time for the higher priority new BE1 request. In summary this mechanism artificially increases the priority of the BE3 request to clear it out of the way of the higher priority new BE1 request, thus minimizing the waiting time in a request pool of a higher priority request behind a lower priority request.

Figure 5:
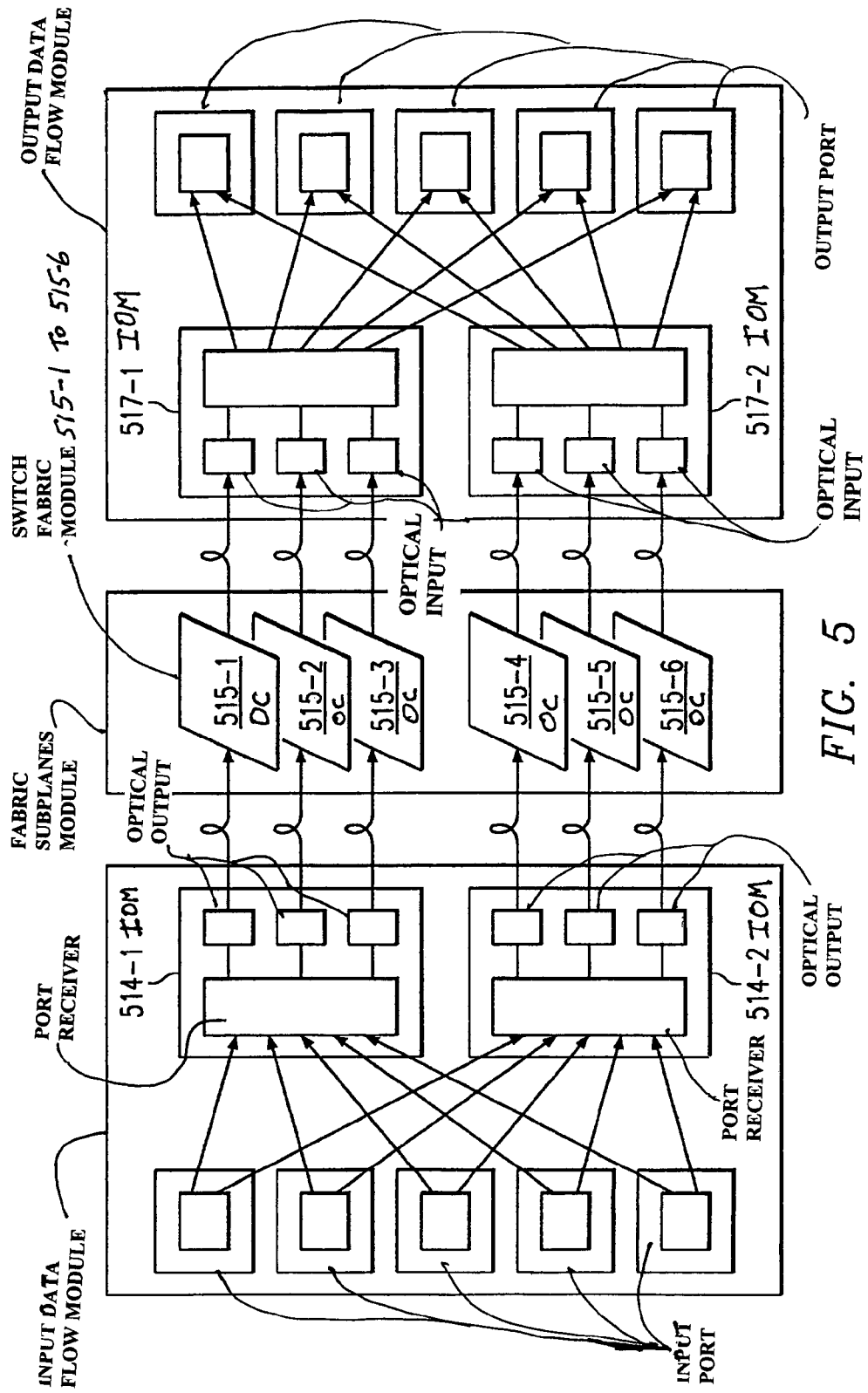
FIG. 5 is a simplified block diagram illustrating data flow through a physical router system according to the present embodiment.

The requests in request pool 302-0 are then examined in a priority order to be sent through Banyan network 40, which models the router switch fabric, for example an optical crossbar switch. FIG. 5 is a simplified block diagram illustrating date flow through a physical router system according to the present embodiment. There are two input side internal optics modules (IOMs) 514-1 and 514-2, six switch fabric subplanes 515-1 through 515-6 (i.e. optical switches), and two output side IOMs 517-1 and 517-2. Input side IOMs 514-1 and 514-2 can each receive just one chunk per ingress ASIC on a PFM. Each IOM connects to only three of the six switch subplanes, for example, IOM 514-1 and IOM 517-1 each connect to three switch subplanes 515-1 through 515-3. As shown in the example of FIG. 3, Banyan network 40 is partitioned into six subplanes just as is physical router switch fabric 515-1 through 515-6. The physical resource limitations of IOMs 514-1, 514-2 are modeled by request input select port blocks 303, 304, whereas the physical resource limitations of IOMs 517-1, 517-2 are modeled by request output accept ports 306, 307. The router switch fabric is a crossbar and each input and output can be used only once, with no other restrictions. Any input can connect to any output, so the Banyan network subplanes model no physical restrictions. The input restriction is enforced by request input select ports 303, 304 and the output restrictions are enforced by request output accept ports 306, 307.

Request input select block 303, Banyan network 40, and request output accept block 306 cooperatively iterate a number of times per chunk period on a solution to maximize the number of connections to the router switch fabric. For each such iteration, request input select block 303 extracts up to two requests per request pool 302-0 through 302-4. At most one request can be sent per Banyan network subplane. Since there are six Banyan subplanes, at most six requests can be extracted overall from the five request pools 302-0 through 302-4 with the further maximum limitation of two requests from any single request pool. One request per iteration is then sent through links 405 to each of the six Banyan subplanes. Thus during the iterations which make up a chunk period, the request input select port keeps track of what resources have been used from previous iterations of the current chunk period, such that resources are not overconsumed. Likewise, the physical resource restrictions of egress IOMs 517-1, 517-2 are modeled and enforced by request output accept ports 306, 307.

Banyan network 40 models a crossbar switch, but employs a network topology requiring many fewer gates than an exact crossbar network and scales as NlogN in contrast with an exact crossbar, which scales as N-squared. At each iteration, some fraction of requests sent through links 405 into Banyan network 40 survive passage through Banyan network 40 and through links 406 to request output accept block 306.

Request output accept block 306 is responsible for determining which of the requests that survived the passage to links 406 are accepted as configurations for the router switch fabric. Criteria include: available physical connection to the internal optics module for the requested configuration; of the six requests, no more than two requests are destined for any single destination port; and a maximum of only six requests, one for each Banyan subplane, exist at any given time during an entire chunk period.

At each iteration, request output accept block 306 accepts zero or more requests. Request output accept block 306, once it decides which requests to accept, sends grant information back in the reverse direction through links 406, through Banyan network 40, and through links 405 to request input select block 303. Thus the grants retrace the path taken by the requests. Request input select block 303 monitors these grants to determine how many Banyan inputs have already been used and to make sure that no more than 2 requests per request pool have been selected for the entire request chunk period.

Once a request is accepted at the output side of Banyan network 40, it will stay accepted until the end of the chunk period. Up to six different requests are selected at the input side at each iteration. If one request is accepted at the Banyan output logic, then on the following iterations up to five new requests are selected. The previously accepted request is occupying an input on the physical router switch fabric, so the associated Banyan input is reserved for that accepted request. This prevents optical switch ports from being granted multiple times during the same chunk period.

After all of the iterations for the chunk period are completed, then request input select block 303 sends those grants through links 326 to switch configuration interface block 305, which formats those grants into messages to be sent through link 327 to configure the router switches at a subsequent time. Request input select block 303 concurrently sends the grants through links 320-1, AIM 15, and through the interconnecting electrical and optical paths to ingress ASIC 20-1, which then implements the grants to build data chunks to be passed through the router switch fabric.

Figure 4:
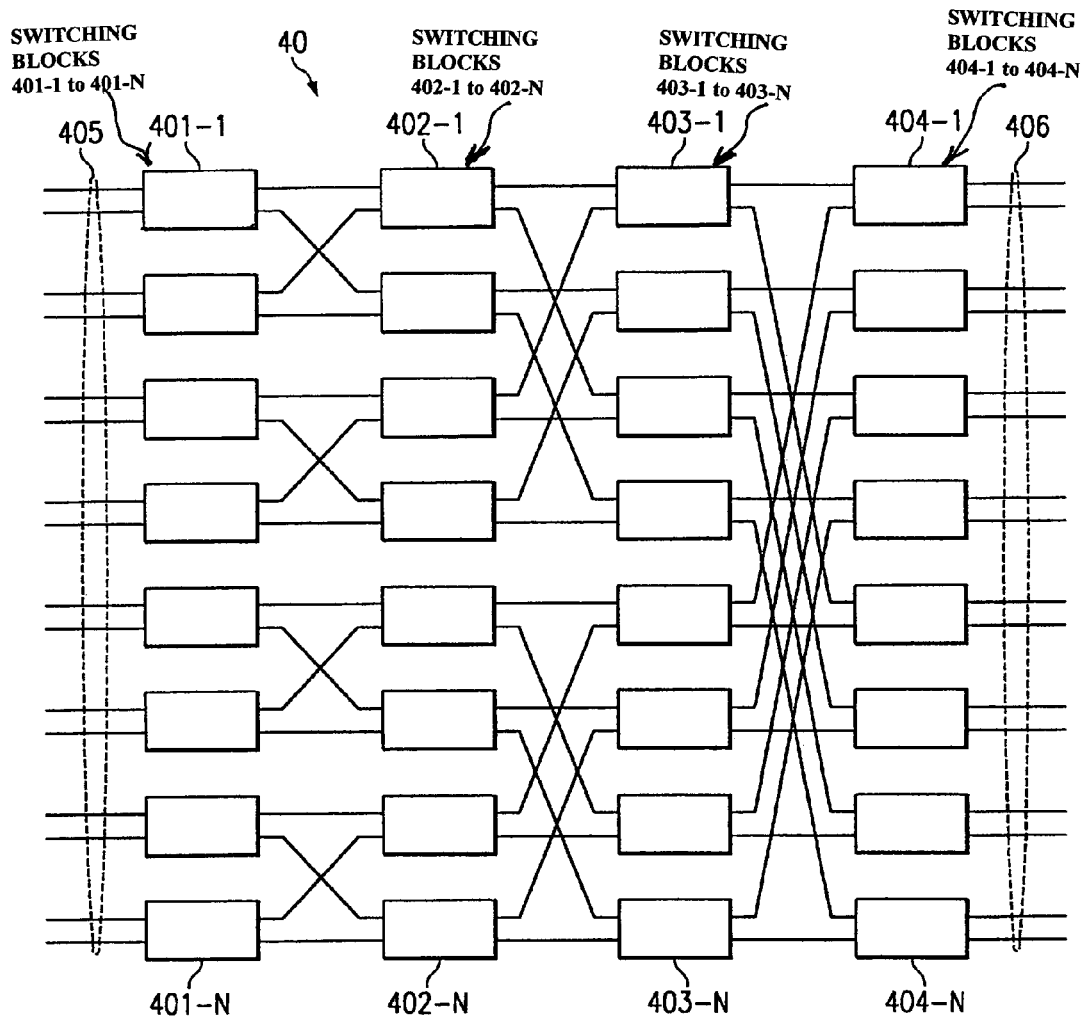
FIG. 4 is a simplified schematic diagram illustrating the internal logic structure of a 16 input, 16 output Banyan network.

FIG. 4 is a simplified schematic diagram illustrating the internal logic structure of a 16 input, 16 output Banyan network 40. Although the preferred embodiment uses a 64 input, 64 output Banyan network, FIG. 4 illustrates the relevant principles with the simplicity of a smaller scale version, since the operating principles are independent of network size. Links 405 are connected to a first stage of switching blocks 401-1 through 401-N, which are in turn interconnected through a second stage of switching blocks 402-1 through 402-N with a third stage of switching blocks 403-1 through 403-N. Third stage switching blocks 403-1 through 403-N are interconnected with output links 406 through a fourth stage of switching blocks 404-1 through 404-N.

Requests are received through links 405 into first stage 2×2 switching blocks 401-1 through 401-N. Each of first stage 2×2 switching blocks 401-1 through 401-N is able to pass the requests straight through or to cross the connection through that switching block to the next stage switching block in the nearest neighbor row. After the requests go through successive 2×2 switching stages 401, 402, 403 and 404, they then reach output links 406, through which the requests then go out of Banyan network 40 and into request output accept block 306 (see FIG. 3). The cross connection between switching stages 402 and 403 link second nearest neighbor rows, whereas the cross connections between switching stages 403 and 404 link fourth nearest neighbor rows.

Each Banyan switch element is able to route requests either straight through, or to cross the connections. However, frequently two requests which enter the Banyan network 40 in the same iteration attempt to exit the same output. Banyan network 40 must choose which request continues, and which must be stopped. Each Banyan switch element 401-1 through 404-N is able to select the highest priority request and allow it to proceed, or if of equal priority to randomly choose one request to continue. A good random selection function is important in order to provide fairness to the input ports.

The Banyan switch element priority selection algorithm uses a hinted request indicator, forward progress information, and request priority level to make the selection. The highest criteria is whether one of the requests is a hinted request. A hinted request occurs when a request survives passage through Banyan network 40 to links 406 and request output accept port logic 306, 307 determines that the required physical resources to route the actual data chunk are consumed by a previously accepted request. If request output accept port logic 306, 307 knows an alternate path which would allow the request to be accepted, it can return the non-accepted response to request input select ports block 303, 304 with a hint specifying which of the six subplanes would allow the request to be accepted. This hinted indicator is used as the highest priority criteria in order to increase the probability of making connections.

A forward progress mechanism, similar to the mechanism used in the Scalable Coherent Interconnect IEEE standard protocol, labels all requests entering the central arbiter as either type A or type B. All requests entering for a period of time are labeled type A, and type B requests have highest priority through the Banyan network elements. This continues until no type B request remains in central arbiter ASIC 30. At this point, requests entering the central arbiter are labeled type B, and type A requests receive the highest priority at a Banyan switching element. The type A or B label is included with each request entering the Banyan network and is used as the highest priority criteria for which a request is allowed to continue when a conflict occurs.

The lowest criteria is the request priority level. There are four priority levels. The highest level is used for administrative chunk requests. Administrative chunks are used by the router switch fabric to maintain timing and to check for failures. Administrative chunk requests are issued in a fixed sequence and time to ensure proper operation of the optical routing fabric. These requests are generated by the central arbiter ASIC and directly enter the request input select port blocks 303, 304. Guaranteed bandwidth requests have second highest request priority, best effort 1 has third request priority, and best effort 2 and 3 combined have the lowest request priority.

After request output accept block 306 processes one of the requests, it then sends information back through Banyan network 40, retracing following the exact path of the requests, to input link 405. This information indicates whether request output accept block 306 accepted or denied the request through Banyan network 40. This information then flows back to request input select block 303 for use in future iterations. Request input select block 303 is responsible after each iteration during a chunk period for choosing from request pool 302 up to two requests to be sent through Banyan network 40. The selection algorithm first examines the available guaranteed bandwidth requests in the order in which they were received. After the guaranteed bandwidth requests have undergone their iterations, the selection algorithm then examines the best effort requests. Best effort requests are also examined in the order they arrived. For purposes of selecting a best effort request, the quality of service level is ignored.

Referring again to FIG. 3, requests to central arbiter 30 include requests that are for a single chunk to be passed through the router switch fabric and requests for multiple chunks to be sent through the router switch fabric. If a packet is able to fit within a single chunk, then that single chunk is arbitrated independently through Banyan network 40. If on the other hand a packet is be broken into multiple chunks, then a single request for multiple chunks is sent to central arbiter 30. If a small number of multiple chunks can be passed through the router switch fabric, this reduces the total amount of packet reassembly time and buffer space required at the egress side of the router switch.

When requests are sent through Banyan network 40 to request output accept block 306, the output request accept block recognizes that a maximum of 16 multi-chunk requests can be simultaneously arbitrated through Banyan network 40 at any one time. If 16 multi-chunk requests for a particular output port are concurrently in arbitration, then a 17th multi-chunk request will be denied, even if physical paths are still available for that request. A future iteration can then use that slot for some other request. Requests entering Banyan network 40 contain information specifying whether the present chunk request is the first, a middle, or the last request for a multi-chunk request, as well as whether it is a multi-chunk request at all. The information is used to limit the number of multi-chunk requests currently being processed by that output port.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A router system incorporating a router switch fabric and a single active central arbiter, said single active central arbiter comprising:
an optical crossbar switch provided as the router switch fabric;
a logic network that models said router switch fabric;
an input logic block connected with an input terminal of said logic network;
an output logic block connected to an output terminal of said logic network, wherein said output logic block is different from said input logic block;
a plurality of request queues, each said request queue interconnected with said input logic block through a request pool; and
a line shelf containing a plurality of router output ports and multiple packet forwarding modules, said packet forwarding modules being interconnected with said central arbiter through arbiter interfaces, wherein each of said packet forwarding modules contains multiple virtual output queues, each said virtual output queue being connected to a highest priority request selection processor.

2. The router system of claim 1 wherein said central arbiter further comprises an ASIC, said ASIC incorporating said logic network.

3. The router system of claim 1 wherein said logic network contains a number of logic gates that scales no greater than NlogN, where N is the number of input ports of said logic network.

4. The router system of claim 3 wherein said logic network is a network.

5. The router system of claim 1 wherein said logic network is partitioned into a plurality of subplanes.

6. The router system of claim 1 wherein said central arbiter further comprises a switch configuration interface interconnected with said input logic block.

7. The router system of claim 1 wherein said router switch fabric comprises an optical crossbar switch, controlled by multiple arbiter interface ASICs, with the multiple arbiter interface ASICs controlled by said central arbiter.

8. The router system of claim 1 wherein said packet forwarding modules are interconnected with said arbiter interfaces through optical fiber cables.

9. The router system of claim 1 wherein said packet forwarding module contains aging counters interconnected with multiple virtual output queues.

10. The router system of claim 1 wherein said highest priority request selection processor comprises a round robin indicator.

11. The router system of claim 1 wherein said highest priority request selection processor comprises a scramble table configured to map said router output ports onto said multiple virtual output queues.

12. The router system of claim 11 wherein said highest priority request selection processor comprises an unscramble table configured to reverse the mapping of said scramble table.

13. The router system of claim 1 wherein said highest priority request selection processor comprises a chunk build instructions structure.

14. The router system of claim 1 wherein said highest priority request selection processor comprises a rate meter.

15. The router system of claim 1 wherein said virtual output queues are organized into guaranteed bandwidth quality of service (QOS) queues and best effort QOS queues.

16. The router system of claim 15 wherein said virtual output queues are organized such that 12 of said queues are allocated to each of said plurality of router output ports.

17. The router system of claim 16 wherein said router system comprises 320 of said router output ports.

18. The router system of claim 15 wherein said virtual output queues are organized such that 6 of said queues are allocated to each of said plurality of router output ports.

19. The router system of claim 18 wherein said router system comprises 640 of said router output ports.

20. The router system of claim 1 wherein each said packet forwarding module comprises an ASIC, said ASIC incorporating said virtual output queues and said highest priority request selection processor.

21. A router system incorporating an optical crossbar switch provided as a router switch fabric and a line shelf, said line shelf comprising a plurality of router output ports and multiple packet forwarding modules, each of said packet forwarding modules containing multiple virtual output queues, each said virtual output queue being connected to a highest priority request selection processor, wherein aging counters are interconnected with multiple virtual output queues.

22. The router system of claim 21 wherein said highest priority request selection processor comprises a round robin indicator.

23. The router system of claim 21 wherein each said packet forwarding module comprises an ASIC, said ASIC incorporating said virtual output queues and said highest priority request selection processor.

24. The router system of claim 21 wherein said router switch fabric comprises an optical crossbar switch, controlled by multiple arbiter interface ASICs, with the multiple arbiter interface ASICs controlled by said central arbiter.

25. A router system incorporating an optical crossbar switch provided as a router switch fabric and a line shelf, said line shelf comprising a plurality of router output ports and multiple packet forwarding modules, each of said packet forwarding modules containing multiple virtual output queues, each said virtual output queue being connected to a highest priority request selection processor, wherein said highest priority request selection processor comprises a scramble table configured to map said router output ports onto said multiple virtual output queues.

26. The router system of claim 25 wherein said highest priority request selection processor comprises an unscramble table configured to reverse the mapping of said scramble table.

27. A router system incorporating an optical crossbar switch provided as a router switch fabric and a line shelf, said line shelf comprising a plurality of router output ports and multiple packet forwarding modules, each of said packet forwarding modules containing multiple virtual output queues, each said virtual output queue being connected to a highest priority request selection processor, wherein said highest priority request selection processor comprises a chunk build instructions structure.

28. A router system incorporating an optical crossbar switch provided as a router switch fabric and a line shelf, said line shelf comprising a plurality of router output ports and multiple packet forwarding modules, each of said packet forwarding modules containing multiple virtual output queues, each said virtual output queue being connected to a highest priority request selection processor, wherein said highest priority request selection processor comprises a rate meter.

29. A router system incorporating an optical crossbar switch provided as a router switch fabric and a line shelf, said line shelf comprising a plurality of router output ports and multiple packet forwarding modules, each of said packet forwarding modules containing multiple virtual output queues, each said virtual output queue being connected to a highest priority request selection processor, wherein said virtual output queues are organized into guaranteed bandwidth quality of service (QOS) queues and best effort QOS queues.

30. The router system of claim 29 wherein said virtual output queues are organized such that 12 of said queues are allocated to each of said plurality of router output ports.

31. The router system of claim 30 wherein said router system comprises 320 of said router output ports.

32. The router system of claim 29 wherein said virtual output queues are organized such that 6 of said queues are allocated to each of said plurality of router output ports.

33. The router system of claim 32 wherein said router system comprises 640 of said router output ports.

34. A method of router central arbitration for a router having a router switch fabric and a plurality of output ports, said method comprising:
   a. providing an optical crossbar switch provided as the router switch fabric;
   b. storing incoming information packet address pointers in multiple virtual output queues;
   c. determining the priority of packet information in said multiple virtual output queues for requesting passage through said router switch fabric;
   d. based on said determining, sending requests for said passage to a central arbiter;
   e. buffering said requests at the input to said central arbiter;
   f. selecting buffered requests for arbitration by said central arbiter;
   g. passing said selected requests through a network that models said router switch fabric;
   h. accepting said passed requests in accordance with predetermined criteria;
   I. iterating steps 37-*f*, 37-*g*, and 37-*h* through the duration of a chunk period; and
   j. generating and delivering grant information based on a predetermined set of arbitration rules.

35. The method of claim 34, further comprising prior to said storing, mapping said packet address pointers randomly onto said multiple virtual output queues using a scramble table.

36. The method of claim 35, further comprising prior to sending said requests, reversing said mapping of said packet address pointers using an unscrambling table.

37. The method of claim 36, further comprising after delivering said grant information, mapping said packet address pointers onto said multiple virtual output queues using said scramble table.

38. The method of claim 34 wherein said multiple virtual output queues are organized into a plurality of guaranteed bandwidth quality of service (QOS) queues each having an allocated bandwidth and a plurality of best effort QOS queues.

39. The method of claim 38 wherein 12 best effort QOS queues of said plurality of best effort QOS queues represent packets destined for each of said plurality of output ports of said router system.

40. The method of claim 39 wherein said router system comprises 320 of said router output ports.

41. The method of claim 38 wherein said virtual output queues are organized such that 6 of said queues are allocated to each of said plurality of router output ports.

42. The method of claim 41 wherein said router system comprises 640 of said router output ports.

43. The method of claim 38 wherein said determining comprises:
   k. ensuring that a maximum allowable outstanding requests limit to said central arbiter is not exceeded;
   l. for the duration of a chunk period, ensuring that a maximum number of issued requests limit is not exceeded;
   m. for a guaranteed bandwidth queue, if said queue has content and has not exhausted its allocated bandwidth, then issuing a request to said central arbiter; and
   n. iterating steps 51-*k*, 51-*l*, and 51-*m* until the first to occur of exceeding maximum allowable outstanding requests limit, exceeding maximum number of issued requests limit, or iterating through all said guaranteed bandwidth queues.

44. The method of claim 43 wherein a maximum limit of 24 outstanding requests are allowable at any time.

45. The method of claim 43 wherein a maximum limit of two issued requests per chunk period are allowable.

46. The method of claim 43 wherein said allocated bandwidth is controlled by rate metering.

47. The method of claim 43 wherein said determining further comprises:
   o. if all guaranteed bandwidth queues have been iterated without exceeding said maximum allowable outstanding requests limit or said maximum number of issued requests limit, then for a best effort queue, if the packets within said best effort queue fill an information chunk, issuing a request;
   p. if said best effort queue has reached a time out limit, then issuing a request; and
   q. iterating steps 55-*o* and 55-*p*, until the first to occur of exceeding maximum allowable outstanding requests limit, exceeding maximum number of issued requests limit, or iterating through all said best effort queues.

48. The method of claim 47 wherein said information chunk is filled with approximately 400 bytes of packet information.

49. The method of claim 47 wherein said best effort queues are subdivided into first best effort queues, second best effort queues, and third best effort queues in order of decreasing priority, and wherein said iterating step 55-*q* is performed sequentially on all said first best effort queues, then on all said second best effort queues, and last on all said third best effort queues.

50. The method of claim 49 wherein said time out limit differs between respective first, second, and third best effort queues.

51. The method of claim 34 wherein said router switch fabric comprises an optical crossbar switch, controlled by multiple arbiter interface ASICs, with the multiple arbiter interface ASICs controlled by said central arbiter.

52. The method of claim 34 wherein said virtual output queues are contained in packet forwarding modules within said router system.

53. The method of claim 52 wherein said virtual output queues are contained in ASICs, which are incorporated into said packet forwarding modules.

54. The method of claim 53 wherein said information packet address pointers point to addresses of information packets stored in a RAM external to said ASICs.

55. The method of claim 34 wherein said sending of said requests to said central arbiter comprises transmitting said requests through an optical fiber cable.

56. The method of claim 34 wherein said buffering comprises dynamically filling a request pool to a predetermined capacity of stored requests.

57. The method of claim 56 wherein said predetermined capacity is on the order of eight stored requests.

58. The method of claim 56 wherein said selecting comprises extracting from each request pool of a plurality of such request pools no more than a request pool maximum limit of buffered requests, provided that no more than a network limit of buffered requests are extracted overall from said plurality of request pools, said selecting being performed at each iteration of an arbitration algorithm.

59. The method of claim 58 wherein said request pool maximum limit is two said buffered requests.

60. The method of claim 58 wherein passing said selected requests comprises passing said selected requests through a logic network having NlogN logic gates, wherein N is the number of said output ports.

61. The method of claim 60 wherein said logic network is a Banyan network.

62. The method of claim 61 wherein said Banyan network is partitioned into a plurality of subplanes, and wherein said network limit of buffered requests is one request per each said subplane.

63. The method of claim 62 wherein said plurality of subplanes comprises six subplanes.

64. The method of claim 58 wherein said plurality of request pools comprises five request pools.

65. The method of claim 58 wherein said selecting of said buffered requests is performed sequentially on said buffered requests in a request pool in the order in which said respective request was received in said request pool.

66. The method of claim 56 wherein said predetermined set of arbitration rules include selecting a maximum limit of requests for an entire request chunk period.

67. The method of claim 66 wherein said maximum limit is two requests per request pool for an entire chunk period.

68. The method of claim 34 wherein said predetermined criteria include availability of physical connection to said router switch fabric for a requested switch configuration and no more than two requests per chunk period destined for a single said output port.

69. A method of central arbitration for a router having a router switch fabric and a plurality of output ports, said method comprising:
  a. providing an optical crossbar switch provided as the router switch fabric;
  b. sending requests to a central arbiter for passage through said router switch fabric of data packets destined for each of said plurality of output ports;
  c. buffering said requests at the input to said central arbiter;
  d. selecting buffered requests for arbitration by said central arbiter;
  e. passing selected requests through a network that models said router switch fabric;
  f. accepting said passed requests in accordance with predetermined criteria;
  g. iterating steps 72-*d*, 72-*e*, and 72-*f* through the duration of a chunk period; and
  h. generating and delivering grant information based on a predetermined set of arbitration rules.

70. The method of claim 69 wherein said router switch fabric comprises an optical crossbar switch, controlled by multiple arbiter interface ASICs, with the multiple arbiter interface ASICs controlled by said central arbiter.

71. The method of claim 69 wherein said sending of said requests to said central arbiter comprises transmitting said requests through an optical fiber cable.

72. The method of claim 69 wherein said buffering comprises dynamically filling a request pool to a predetermined capacity of stored requests.

73. The method of claim 72 wherein said predetermined capacity is on the order of eight stored requests.

74. The method of claim 72 wherein said selecting comprises extracting from each request pool of a plurality of such request pools no more than a request pool maximum limit of buffered requests, provided that no more than a network limit of buffered requests are extracted overall from said plurality of request pools, said selecting being performed at each iteration of an arbitration algorithm.

75. The method of claim 74 wherein said request pool maximum limit is two said buffered requests.

76. The method of claim 74 wherein passing said selected requests comprises passing said selected requests through a logic network having NlogN logic gates, wherein N is the number of said output ports.

77. The method of claim 76 wherein said logic network is a Banyan network.

78. The method of claim 77 wherein said Banyan network is partitioned into a plurality of subplanes, and wherein said network limit of buffered requests is one request per each said subplane.

79. The method of claim 78 wherein said plurality of subplanes comprise six subplanes.

80. The method of claim 74 wherein said plurality of request pools comprises five request pools.

81. The method of claim 74 wherein said selecting of said buffered requests is performed sequentially on said buffered requests in a request pool in the order in which said respective request was received in said request pool.

82. The method of claim 72 wherein said predetermined set of arbitration rules include selecting a maximum limit of requests for an entire request chunk period.

83. The method of claim 82 wherein said maximum limit is two requests per request pool for an entire chunk period.

84. The method of claim 69 wherein said predetermined criteria include availability of physical connection to said router switch fabric for a requested switch configuration and no more than two requests per chunk period destined for a single said output port.

85. A method of central arbitration for an optical crossbar switch provided as a router having a router switch fabric, a plurality of packet forwarding modules, and a plurality of output ports, said method comprising a first stage of distributed arbitration on said packet forwarding modules and a second stage of global arbitration on a central arbiters such that said first stage issues requests to said second stage for grants to pass data chunks through said router switch fabric, wherein arbitration congestion in said second stage is limited in said first stage by an algorithm using information from the time delay between the issue of a request in said first stage and the receipt in the first stage of a corresponding grant from said second stage.

86. A method of central arbitration for an optical crossbar switch provided as a router having a router switch fabric, a plurality of packet forwarding modules, and a plurality of output ports, said method comprising a first stage of distributed arbitration on said packet forwarding modules and a second stage of global arbitration on a central arbiter, such that said first stage issues requests to said second stage for grants to pass data chunks through said router switch fabric, wherein said first stage further comprises storing information packet headers in a plurality of virtual output queues (VOQs).

87. The method of claim 86 wherein arbitration congestion in said second stage due to synchronization is reduced in said first stage by mapping said plurality of output ports onto said VOQs using a scramble table.

88. The method of claim 86 wherein a portion of said information packet headers are stored in preprovisioned guaranteed bandwidth (GB) VOQs that are rate limited thereby providing guaranteed bandwidth requests.

89. The method of claim 88 wherein a portion of said information packet headers are stored in best effort (BE) VOQs, thereby providing best effort requests.

90. The method of claim 89 wherein requests for said GB data chunks are allowed to pass ahead of requests for said BE chunks in said second stage.

91. The method of claim 89 wherein said issued requests are processed iteratively through subplanes in said second stage, such that if physical routing resources are consumed by first request, if a second request for said routing resources is non-accepted in a subsequent request, and a logic block in said second stage knows an alternate routing path that would allow said non-accepted request to be accepted, then said logic block can return said non-accepted request with a hint specifying which of said subplanes would allow said non-accepted request to be accepted.

92. The method of claim 91 wherein said hinted indicator is used as the highest priority criterion in processing of said requests through said second stage.

93. The method of claim 89 further comprising maintaining a first count of all outstanding requests to said second stage, an independent second count of outstanding best effort requests only, and a third count of outstanding guaranteed bandwidth requests only.

94. The method of claim 93 wherein said first stage further comprises:
  a. ensuring that a maximum allowable outstanding requests limit to said second stage is not exceeded;
  b. for the duration of a chunk period, ensuring that a maximum number of issued requests limit to said second stage is not exceeded;
  c. for a guaranteed bandwidth queue, if said queue has content and has not exhausted its allocated bandwidth, then issuing a request to said second stage; and
  d. iterating steps 96-*a*, 96-*b*, and 96-*c* until the first to occur of exceeding said maximum allowable outstanding requests limit, exceeding maximum number of issued requests limit, or iterating through all said guaranteed bandwidth queues.

95. The method of claim 94 wherein said first stage further comprises:
  e. if all guaranteed bandwidth queues have been iterated without exceeding said maximum allowable outstanding requests limit or said maximum number of issued requests limit, then for a best effort queue, if the packets within said best effort queue fill an information chunk, issuing a request;
  f. if said best effort queue has reached a time out limit, then issuing a request; and
  g. iterating steps 97-*e* and 97-*f* until the first to occur of exceeding said maximum allowable outstanding requests limit, exceeding said maximum number of issued requests limit, or iterating through all said best effort queues.

96. The method of claim 95 wherein said best effort queues are subdivided into first best effort queues, second best effort queues, and third best effort queues in order of decreasing priority, and wherein said iterating step 97-*g* is performed sequentially on all said first best effort queues, then on all said second best effort queues, and last on all said third best effort queues, such that requests issued by said best effort queues in order of decreasing priority are respectively first, second, and third best effort requests.

97. The method of claim 96 wherein said time out limit differs between respective first, second, and third best effort queues.

98. The method of claim 96 wherein said issued requests in said second stage are stored in a plurality of request pools, such that best effort requests in the same request pool with the same source and destination are assigned priorities to be processed in said second stage in the order received in said request pool, provided that if a higher priority best effort request is newly received in said request pool already containing a previously received lower priority best effort request, then the priority of said previously received best effort request is increased to the priority level of said higher priority newly received best effort request.

99. A method of central arbitration for a router having an optical crossbar switch provided as a router switch fabric, a plurality of packet forwarding modules, and a plurality of output ports, said method comprising a first stage of distributed arbitration on said packet forwarding modules and a second stage of global arbitration on a central arbiter, such that said first stage issues requests to said second stage for grants to pass data chunks through said router switch fabric, wherein up to a predetermined maximum number of multi-chunk requests are processed concurrently in said second stage, each said multi-chunk request corresponding to a packet exceeding a data capacity of a single chunk.

100. A method of central arbitration for a router having an optical crossbar switch provided as a router switch fabric, a plurality of packet forwarding modules, and a plurality of output ports, said method comprising a first stage of distributed arbitration on said packet forwarding modules and a second stage of global arbitration on a central arbiter, such that said first stage issues requests to said second stage for grants to pass data chunks through said router switch fabric, wherein said second stage models a higher order network with iterating on a lower order network.

* * * * *